(12) United States Patent
Lobato et al.

(10) Patent No.: US 7,967,250 B2
(45) Date of Patent: Jun. 28, 2011

(54) HYBRID AIRCRAFT FUSELAGE STRUCTURAL COMPONENTS AND METHODS OF MAKING SAME

(75) Inventors: Fabiano Lobato, São José dos Campos (BR); Clóvis Augusto Eça Ferreira, São José dos Campos (BR); José Donizette Aguiar, São José dos Campos (BR); Lucio Camargo Fortes, São José dos Campos (BR); Sadao Takanashi, São José dos Campos (BR)

(73) Assignee: EMBRAER—Empresa Brasileira de Aeronáutica, São José dos campos-SP (BR)

( * ) Notice: Subject to any disclaimer, the term of this patent is extended or adjusted under 35 U.S.C. 154(b) by 806 days.

(21) Appl. No.: 12/119,210

(22) Filed: May 12, 2008

(65) Prior Publication Data
US 2009/0277994 A1 Nov. 12, 2009

(51) Int. Cl.
*B64C 1/00* (2006.01)
(52) U.S. Cl. ........................... 244/119; 244/120
(58) Field of Classification Search .................. 244/119, 244/120, 117 R, 2, 133, 132; 52/787.12
See application file for complete search history.

(56) References Cited

U.S. PATENT DOCUMENTS

| | | | | |
|---|---|---|---|---|
| 3,976,269 A * | 8/1976 | Gupta | .......................... | 244/119 |
| 5,242,523 A * | 9/1993 | Willden et al. | ............... | 156/285 |
| 6,114,012 A * | 9/2000 | Amaoka et al. | ............... | 428/182 |
| 7,074,474 B2 * | 7/2006 | Toi et al. | ...................... | 428/102 |
| 7,325,771 B2 * | 2/2008 | Stulc et al. | .................... | 244/119 |
| 7,716,835 B2 * | 5/2010 | Johnson et al. | ............... | 29/897.2 |
| 2003/0080251 A1 * | 5/2003 | Anast | ............................ | 244/119 |
| 2006/0226287 A1 * | 10/2006 | Grantham et al. | ............ | 244/119 |
| 2008/0111024 A1 * | 5/2008 | Lee et al. | ....................... | 244/121 |
| 2008/0149768 A1 * | 6/2008 | Sarh | ............................... | 244/120 |
| 2008/0237442 A1 * | 10/2008 | Sarh | ............................... | 249/184 |
| 2009/0057487 A1 * | 3/2009 | Velicki et al. | ................. | 244/119 |
| 2010/0308165 A1 * | 12/2010 | Markowski et al. | .......... | 244/119 |

* cited by examiner

*Primary Examiner* — Christopher P Ellis
(74) *Attorney, Agent, or Firm* — Nixon & Vanderhye PC

(57) ABSTRACT

An aircraft fuselage assembly of basic construction in composite materials employs metallic frames with reduced quantity of metallic shear ties attached to the composite stiffened skin, formed by two or more longitudinal panels, spliced with longitudinal metallic splice members. Typically, the latitudinal metallic frame members are fastened to the inward outstanding flange portion of the composite stringers which are in turn integrated to the skin. As such, the frame members are spaced from (floating over) the fuselage skin. An electrical path may thus be established so as to protect the fuselage structure against the impact of electrical discharges commonly encountered in the atmosphere by providing metallic shear ties interconnecting the frame and splice members so as to span the space therebetween.

16 Claims, 9 Drawing Sheets

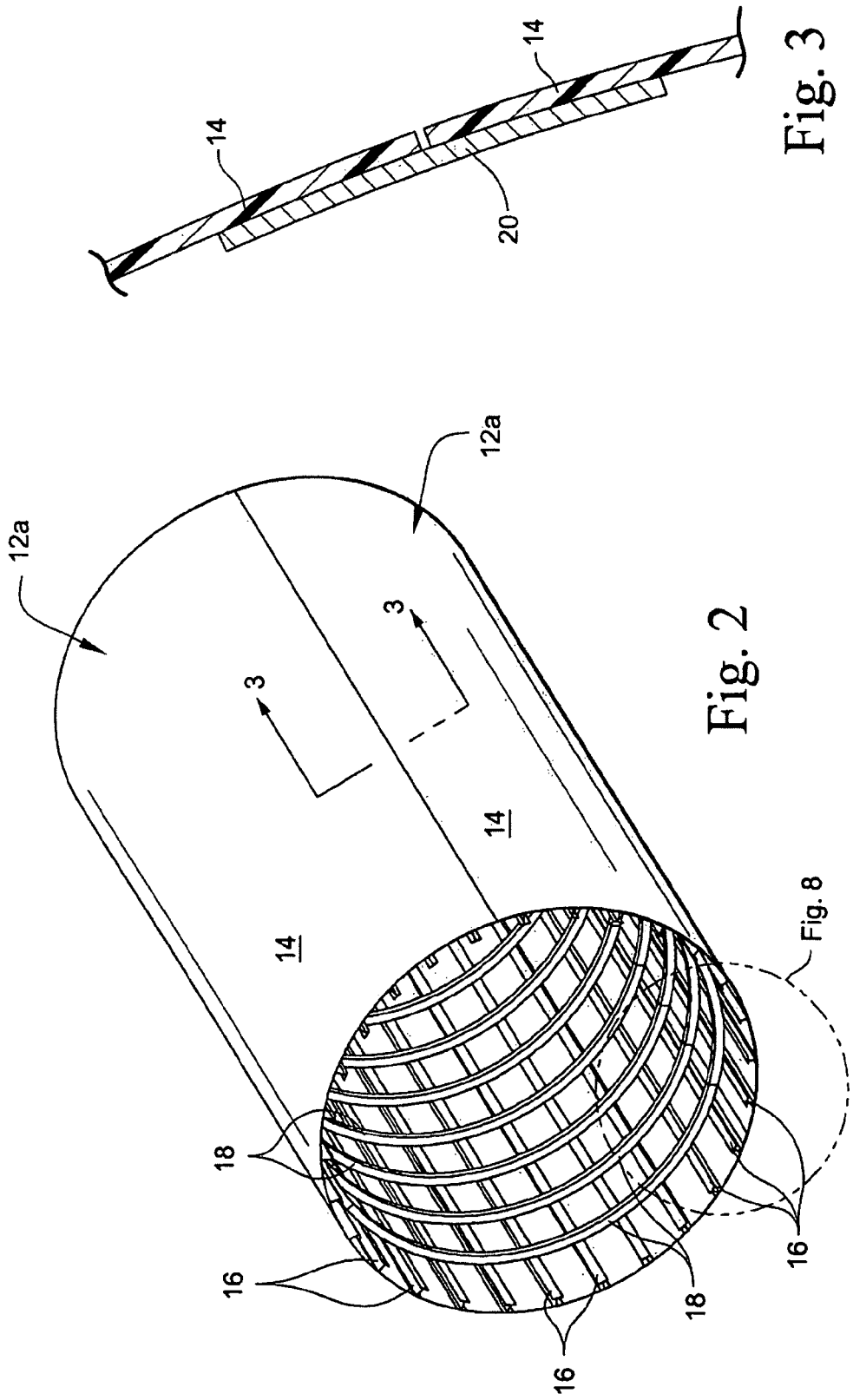

HYBRID AIRCRAFT FUSELAGE STRUCTURAL COMPONENTS AND METHODS OF MAKING SAME

FIELD OF THE INVENTION

The present invention relates generally to structural components for aircraft fuselages and methods of making the same.

BACKGROUND OF THE INVENTION

An aircraft fuselage is typically constructed as a series of longitudinally spaced circumferential frame members which define the general latitudinal (cross-sectional) fuselage shape, and a series of spaced stringer members running longitudinally with respect to the aircraft fuselage which contribute to the stiffness of the external skin. Together, the frames and stringers constitute a robust internal structure that provide support to the external fuselage skin.

The aircraft fuselage skin is formed of a single piece or separate pieces joined with skin splice straps, covering the various members of the internal structure. The frames and stringers are attached to the skin using different techniques. Usually, the stringers are joined to the skin pieces in an earlier stage of the manufacturing cycle, using rivets or adhesive, to form stiffened skin panels. In a later stage, the stiffened skin panels are spliced and attached to the frames. For ease of production, the frames can be fabricated in segments, in the same quantity as of the stiffened skin panels. The corresponding segments of the frames can be installed onto each stiffened skin panel, forming framed stiffened skin panels. In a next stage, the framed stiffened skin panels can be assembled, and the skins and frames are spliced.

Three different strategies have previously been adopted to integrate the stiffened skin panels and the frames. In one of the strategies, the frame is fastened directly to the stiffened skin panel, using rivets or adhesive. In another strategy, an additional member termed shear tie (or shear clip, or shear cleat) is used, with separate fasteners for the frame and for the stiffened skin panel. An adhesive can be used instead of rivets. The shear ties can be installed to the stiffened skin panel during the same stage wherein the stringers are installed, or in an intermediate stage before the frames are installed. In accordance with a third strategy, the frames are attached to the stiffeners of the stiffened skin panel, without either a direct or indirect attachment to the skin of the stiffened panel.

Whichever the strategy may be adopted, it is important to ensure that the installation of the frames and stringers must be accomplished without structural interference. In this regard, since the stringers are subjected to high axial loads, they therefore must be continuous along the longitudinal extent of the aircraft fuselage. On the other hand, the frames are subjected to high bending loads and therefore must be designed for good depth, to provide a high moment of inertia. Because the frames are designed for deep cross-section, they can accommodate apertures (colloquially terms "mouse holes") to allow for passage of the stringers therethrough.

The aircraft fuselage can be constructed using materials of two distinct groups, namely metallic materials (most commonly aluminum) and composite materials (most commonly laminates of carbon-fiber reinforced epoxy). In previous aircraft designs, only materials pertaining to the same group (either metallic or composite) have been used to manufacture the entire aircraft fuselage structure including skins, stringers and frames. Several viable design reasons for not constructing an aircraft fuselage from metallic and non-metallic materials include: (a) dissimilar materials are prone to corrosion; (b) the joint of a metallic member to a composite member is more complex to accomplish; (c) high interface loads can be generated by temperature changes, within the operational envelop; (d) the technologies involved in the production of metallic parts are very different than those required to fabricate a composite structure.

From the viewpoint of electrics and electronics engineering, the metallic structures have wide acceptance, because metals are electrically conductive. This characteristic is not found in the composite materials, since they have poor or no electric conductivity. On the other hand, composite materials offer significant advantages in terms of weight and manufacturing cost, especially when the design is tailored to the peculiar ability of the composites to integrate the structural members, drastically reducing the quantity of fasteners. If the aircraft body is constructed in composite materials, special details are required, such as the inclusion of a wire mesh ply extending throughout the outer surface of the body skin so as to protect the structure against the impact of electrical discharges commonly encountered in the atmosphere. Additional wires are necessary to replace the natural electric path, represented by the metallic structure. This electric path is useful to connect the electric power generators and batteries to the electric consumers, including lights, motors, computers and other units.

According to known aircraft manufacturing techniques, a complete aircraft fuselage can be fabricated from non-metallic composite materials, with stringers and skins fabricated from similar laminate materials. Such a technique thereby allows all such components to be co-formed with one another, that is to be processed in a single heating cycle inside an autoclave so as to cure the polymeric resin from which the laminates are made. Before entering the autoclave the skins are laid over the stringers, forming a continuous seamless part. After the cure cycle, in the resulting stiffened skin, the stringers and skins are joined by the resin as if they had been bonded. In such an aircraft fuselage structure, the frames are typically separately fabricated from a composite material and are subsequently joined to the skins with shear ties, also fabricated separately from a composite material. The shear ties are fastened to the stiffened skin using a mechanical system based on pins similar to bolts and locking parts similar to nuts. The same system is used to fasten the frames to shear ties. It remains evident that this design has not taken full advantage of the cost-saving and weight-saving gains of the composite material, since too many fasteners are used and the assembly presents low integration level. Like any other all-composite fuselage structure, this conventional design technique requires the installation of additional metallic details to perform the electrical and electronic functions which involve further weight and cost accretion.

In such a composite aircraft fuselage, the stiffened skin is fabricated by wrapping separate mandrels with a laminated tape. Upon curing of the resin, the resulting cylindrical trunks receive the frames. Subsequently, circumferential straps are employed to splice the trunks with butt-type joints, thereby forming the aircraft body assembly. The butt straps are separately fabricated using the same composite material used for the skins. This system relies upon a set of dimensional constrains indicated in the manufacturing drawings to prevent the misalignment of the trunks, which can ruin the assembly of the fuselage.

SUMMARY OF THE INVENTION

It is an object of the present invention to provide an aircraft fuselage assembly which avoids the problems outlined above, is of light weight and is capable of being manufactured economically. In general, the present invention relates to hybrid aircraft fuselage having structural components formed of both metallic and non-metallic materials.

It is another object of the present invention to provide an aircraft wherein the body skins and co-cured integral stringers are made from composite materials, and the presence of metallic frames, shear ties and skin longitudinal splices guarantees an adequate performance of the electrical and electronic systems, including the protection against lightning impacts.

In accordance with some preferred forms, the present invention embodies structural panels for aircraft fuselages having floating latitudinal frame members spaced from the fuselage skin and attached to an upper flange of the longitudinal stringers, the exterior fuselage skin being attached to a lower flange of the stringers.

In accordance with other preferred embodiments of the invention, an aircraft fuselage assembly of basic construction in composite materials employs metallic frames with reduced quantity of metallic shear ties attached to the composite stiffened skin, formed by two or more longitudinal panels, spliced with longitudinal metallic splice members. Typically, the metallic frame members are fastened to the inward outstanding flange portion of the composite stringers which are in turn integrated to the skins. As such, the frame members are spaced from (floating over) the fuselage skin. Depending on the design criteria, some shear ties may still be needed so as to join the frames to the skin, but the numbers of such shear ties may be significantly reduced employing the embodiments of the present invention.

The presence of longitudinal splicing straps made from metallic materials improve the composite body in the following three different ways: (a) by creating efficient electrical paths; (b) by introducing the possibility of adjustment between adjacent trunks alleviating the tolerance constraints associated with an all composite structure, and (c) by optimizing the assembly sequence having the frames added in pieces to the skin segments.

As far as the metallic materials are concerned, various alloys can be used, particularly those based on the aluminum and titanium, according to the design requirements. The frames, shear ties and splice straps can be fabricated from sheets or plates either by forming or machining, or by combining machining and forming. As far as the composite materials are concerned, various configurations can be used, particularly mesh woven or braided, but also unidirectional configurations of fibers in a mat-like structure. The various layers may be inclined (biased) in relation to each other so that the fiber orientation of one layer cross-laps to improve structural integrity of the resulting fuselage skin.

In some embodiments, an aircraft fuselage structural component is provided comprising a skin, longitudinally spaced-apart frame members spaced from the skin and defining a latitudinal section of an aircraft fuselage section, longitudinally oriented stringers having a lower flange joined to the skin and an upper flange joined to the frame members. The stringers and the skin are each formed of a non-metallic material, and the frame members are formed of a metallic material. The stringers and the skin may thus each formed of a co-cured resin reinforced composite material.

Shear ties formed of metallic or non-metallic materials may be provided which span the space between the frame members and the skin so as to structurally unit the frame members and the skin.

An aircraft fuselage may thus be formed from plural aircraft fuselage structural components and longitudinal splice members connected to the skin of adjacent ones of the fuselage structural components so as to join the structural components to one another. The splice members are formed of a metallic material. Thus, when the shear ties are also formed of a metallic material, an electrical path may be established by interconnection of the metallic frame members and the metallic splice members with the metallic shear ties.

A method of making an aircraft fuselage structural component will comprise joining a skin to a lower flange of longitudinal stringers; and thereafter joining latitudinal frame members to an upper flange of the stringers so as to be spaced relationship with the skin. The skin and stringers may be formed of a reinforced resin composite material, and co-cured so as to bond one to another. The frame members and the skin are interconnected with shear ties so as to span the space therebetween. If an electrical path is desired to be established, then the shear ties may be formed of a metallic material so as to interconnect the frame and splice members (each of which is preferably formed of a metallic material).

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein;

FIG. 2 is more detailed perspective view of an aircraft fuselage section having structural panels in accordance with an embodiment of the present invention;

FIG. 3 is a cross-sectional elevational view of a panel joint as taken along line 3-3 I FIG. 2;

Figure 7:
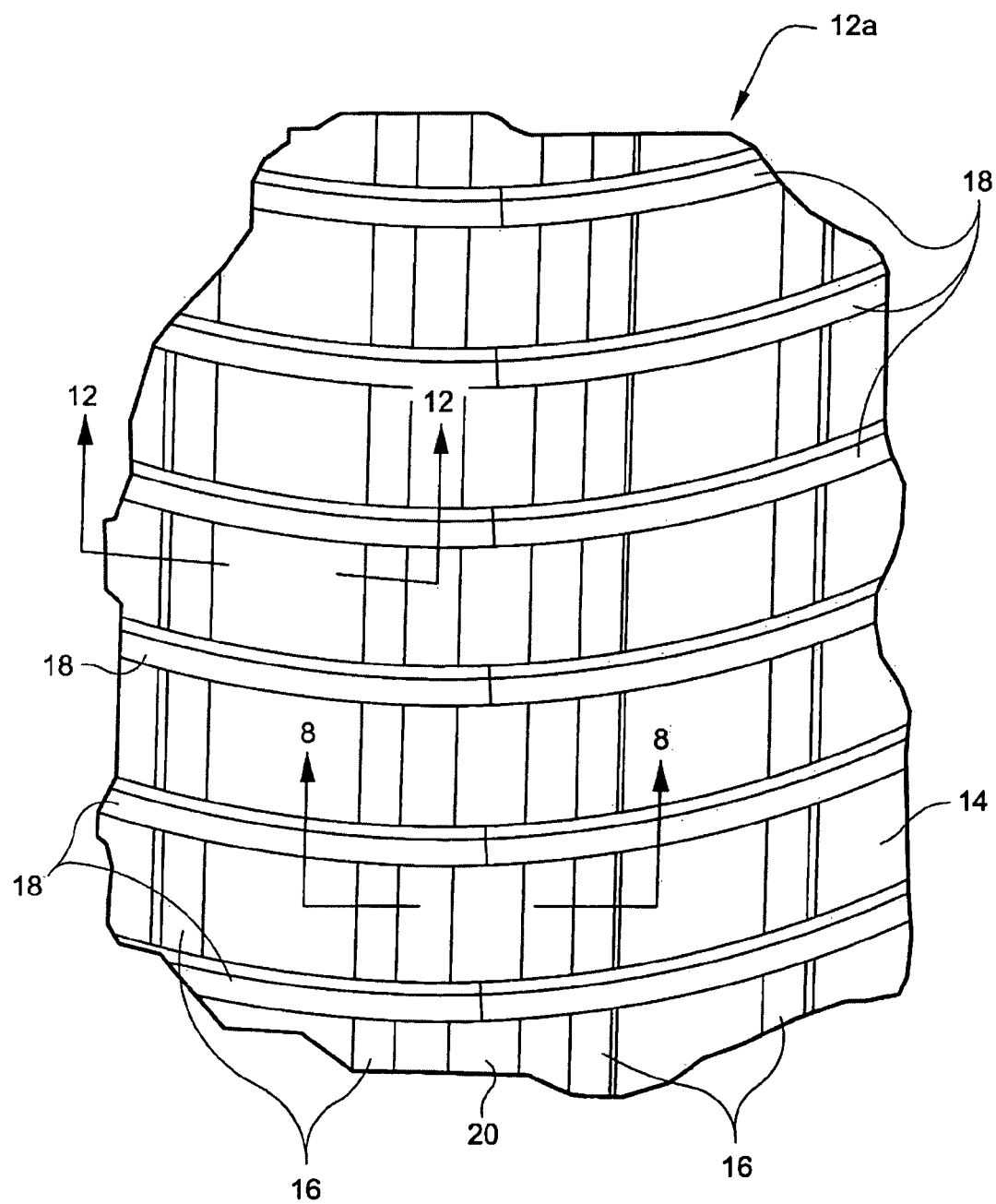
FIG. 7 is an interior substantially plan view of a portion of the aircraft fuselage section shown in FIG. 2.
Figure 8:
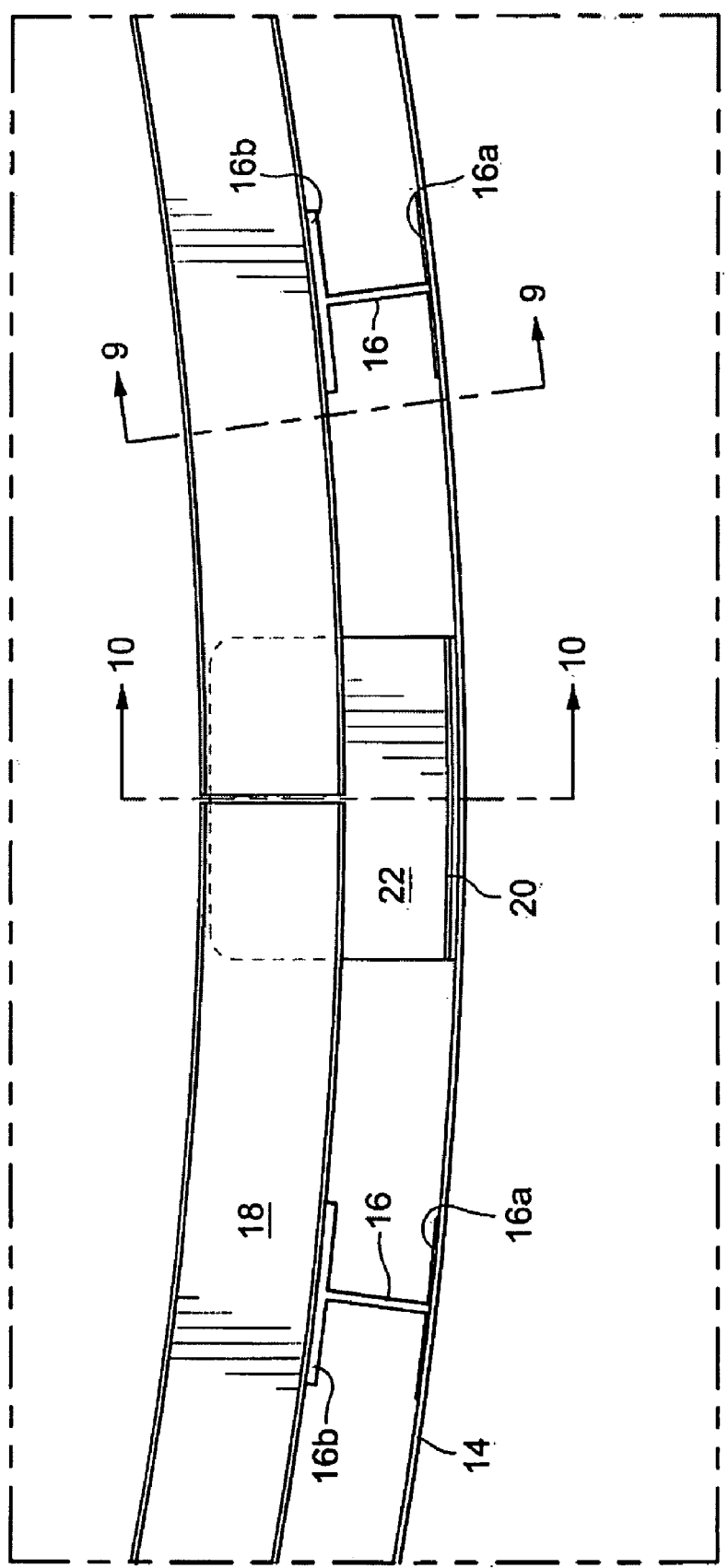
FIG. 8 is a cross-sectional view of the aircraft fuselage section as taken along line 8-8 in FIG. 7.
Figure 9:
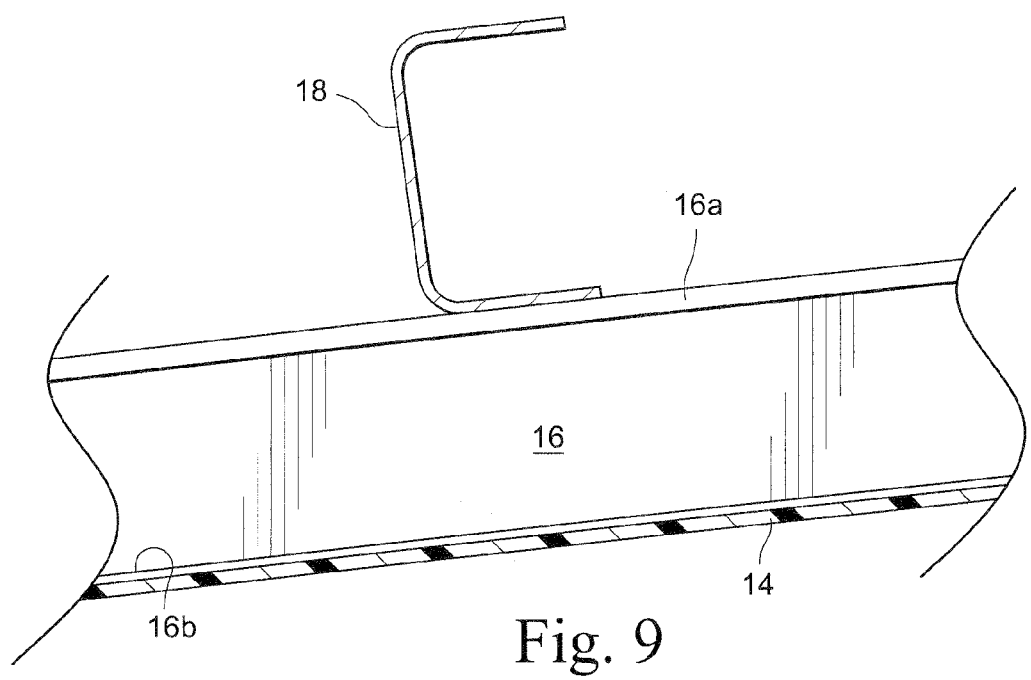
Figure 10:
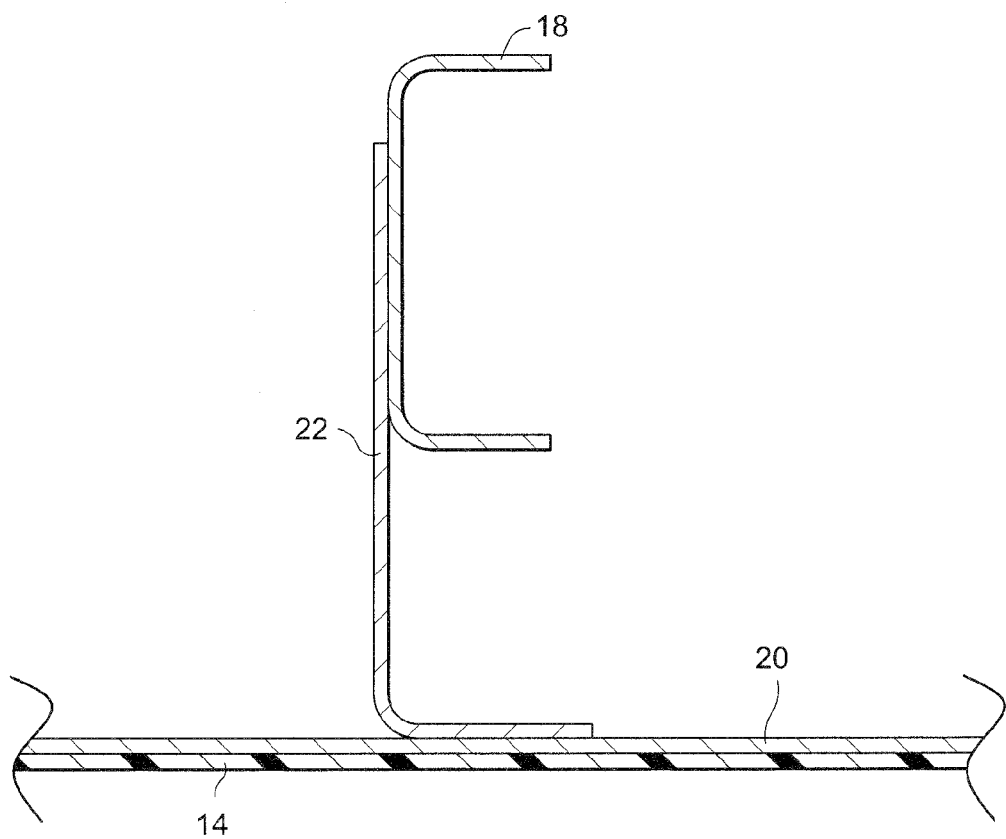
Figure 11:
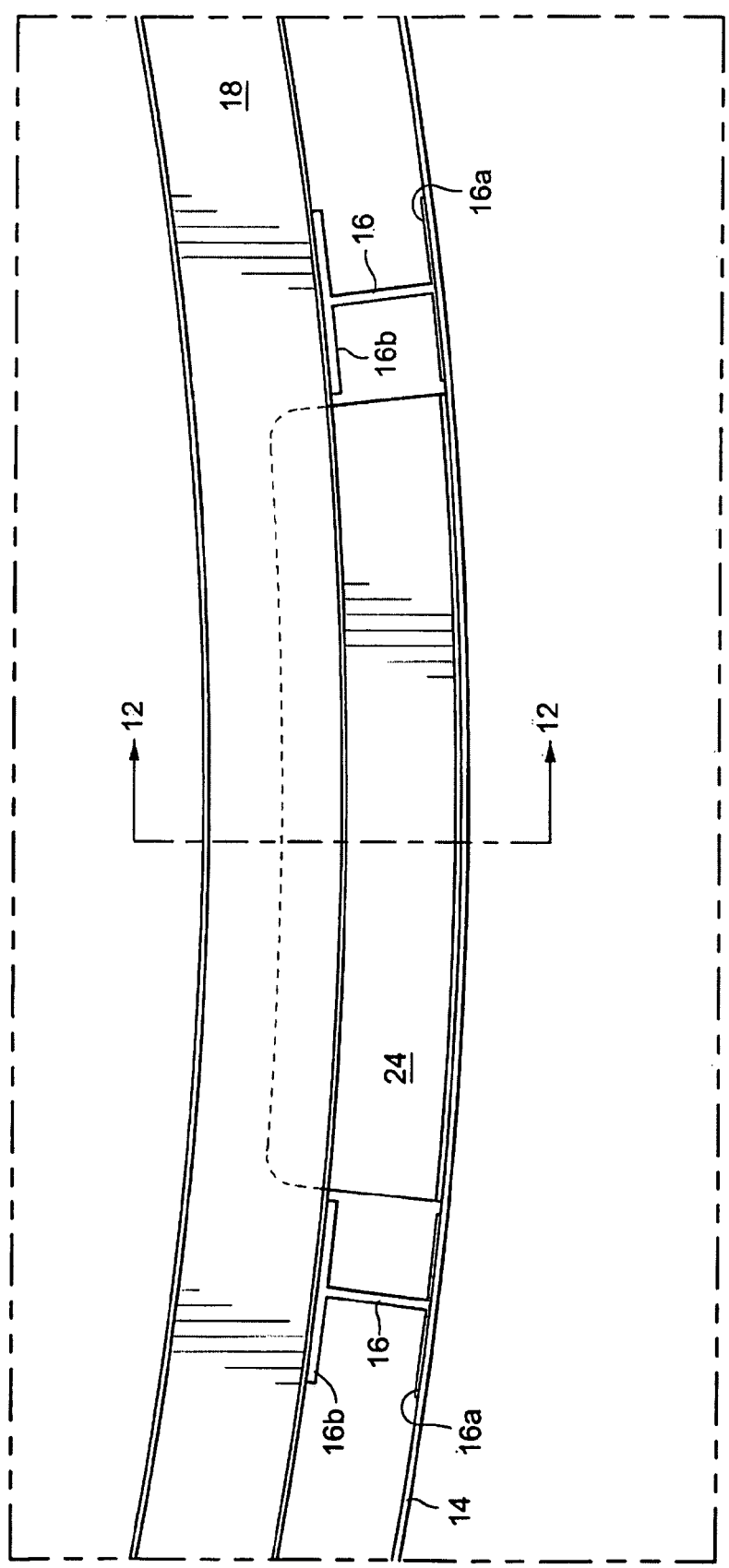
Figure 12:
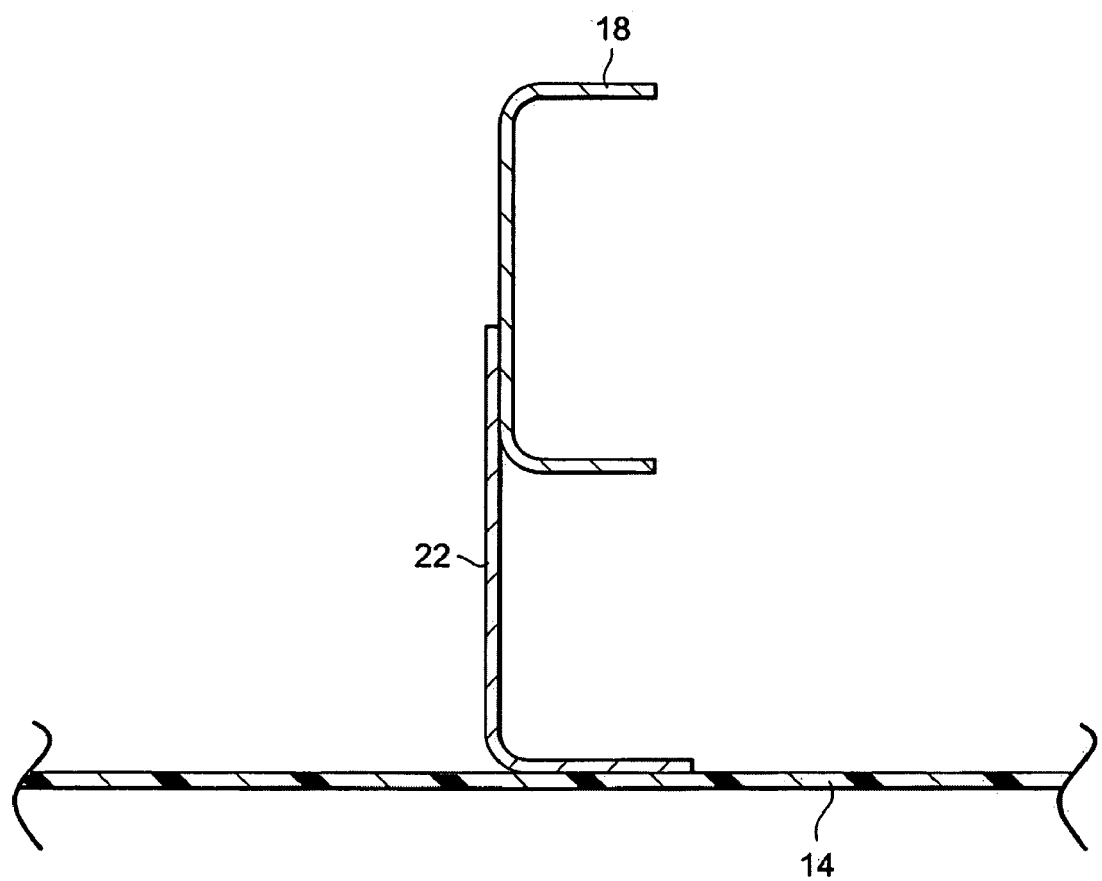

FIGS. 9 and 10 are cross-sectional views of the aircraft fuselage section as taken along lines 9-9 and 10-10, respectively, in FIG. 8;

FIG. 11 is a cross-sectional view of the aircraft fuselage section as taken along line 11-11 in FIG. 7; and FIG. 12 is a cross-sectional view of the aircraft fuselage section as taken along line 12-12 in FIG. 11.

DETAILED DESCRIPTION OF THE INVENTION

Figure 1:
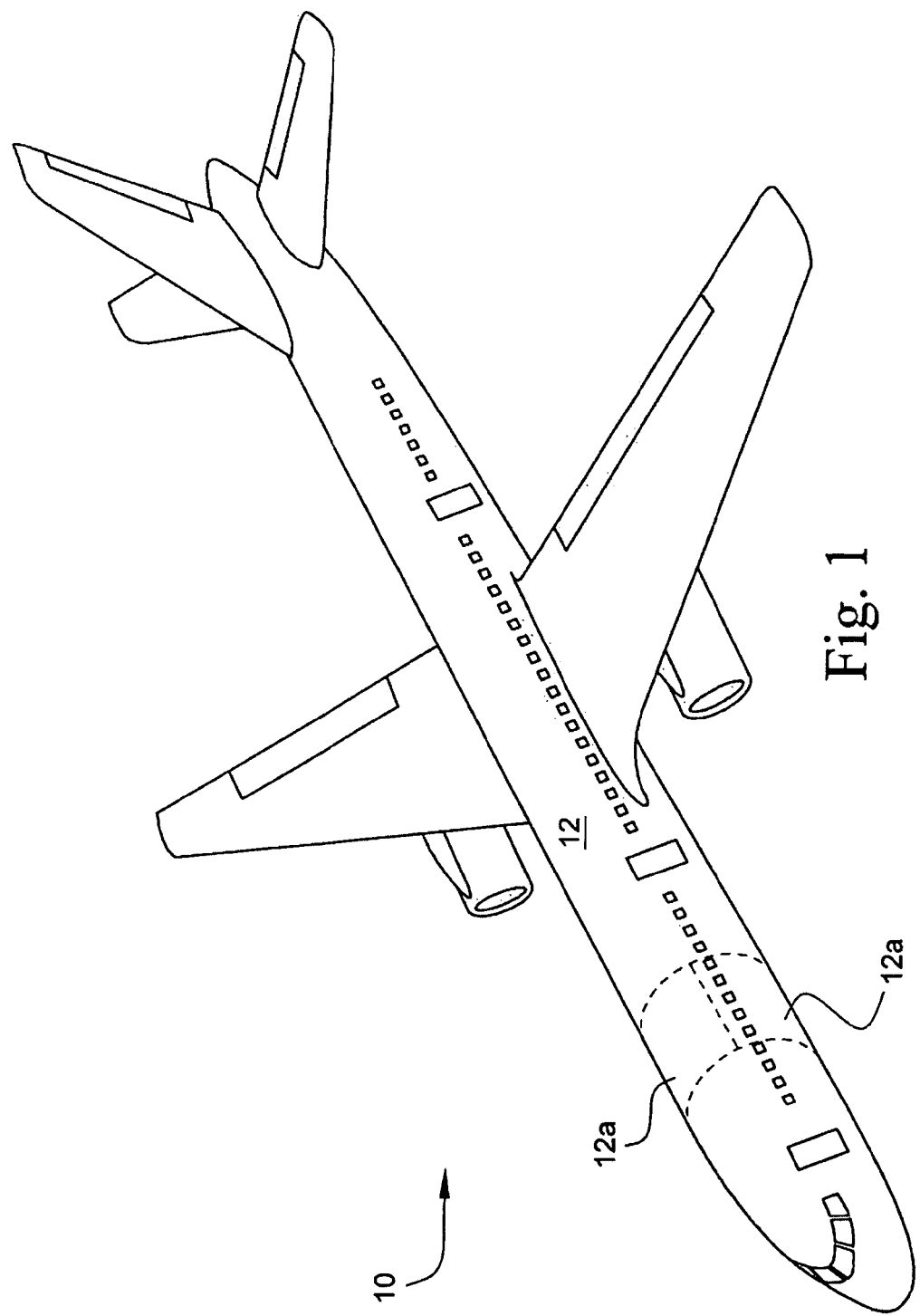
FIG. 1 is a perspective view of an aircraft which includes a structural panel in accordance with an embodiment of the present invention.
Figure 4:
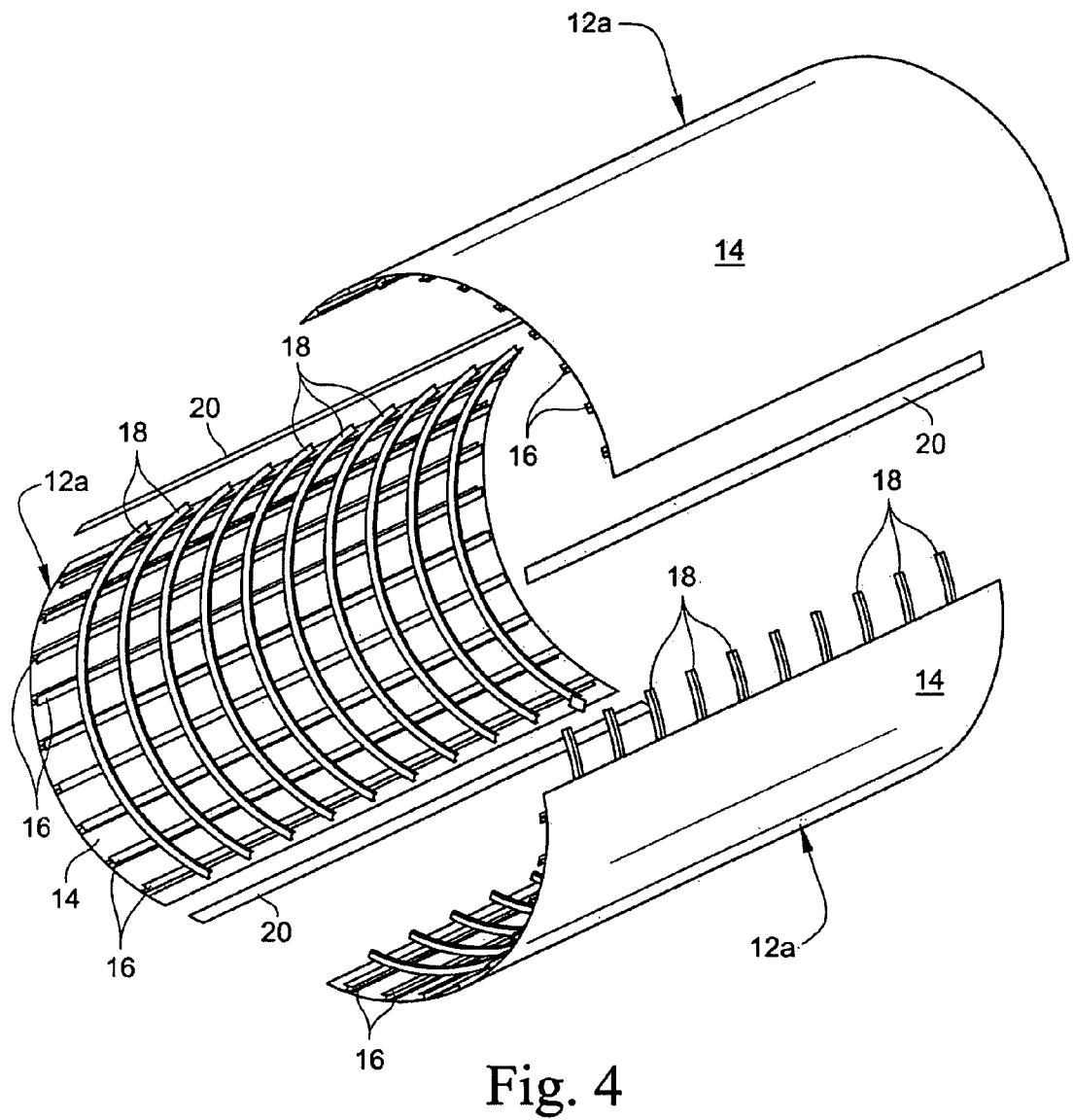
FIG. 4 is an exploded perspective view of the aircraft fuselage section as depicted in FIG. 3.
Figure 5:
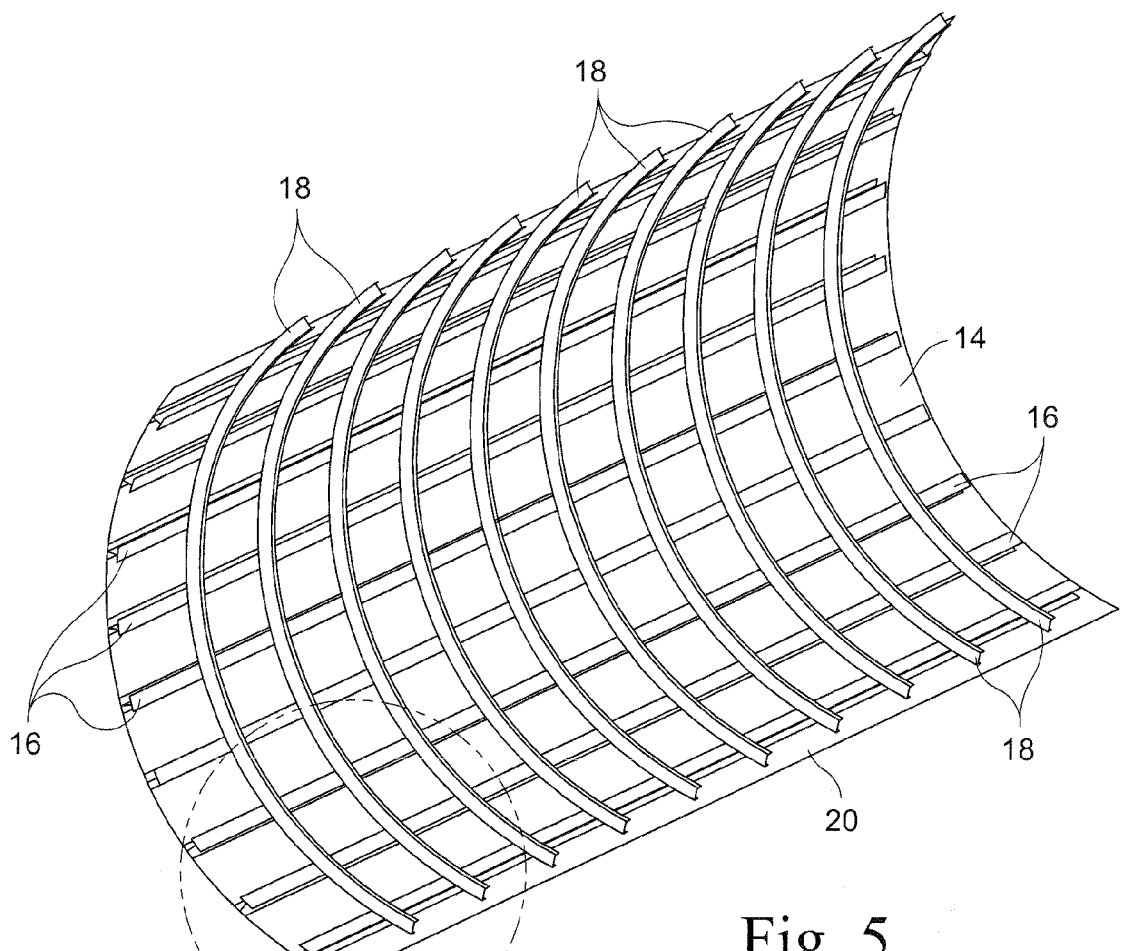
FIG. 5 is a perspective view of a fuselage structural panel employed in the aircraft fuselage section depicted in FIGS. 3 and 4.
Figure 6:
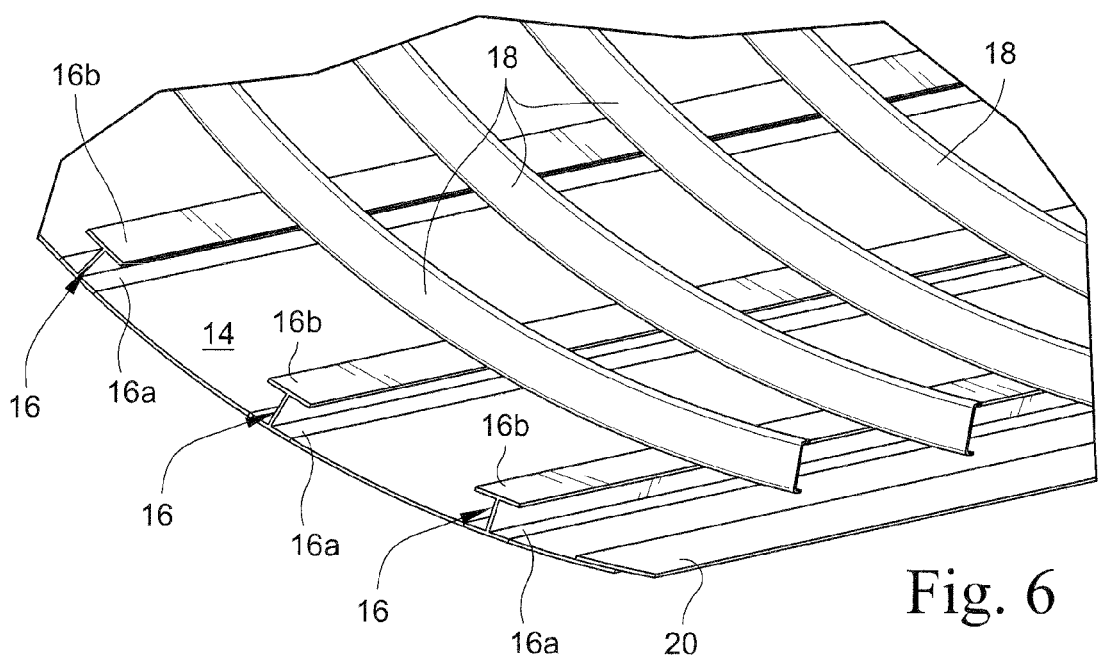
FIG. 6 is a detailed view of a portion of the fuselage structural panel depicted in FIG. 5.

Accompanying FIG. 1 depicts an aircraft 10 which includes a fuselage 12 constructed of a number of conjoined structural panels 12*a* which embody the present invention. It is understood of course that FIG. 1 only shows a representative number of such panels 12*a*. Thus, substantially the entirety of the fuselage will be formed of panels 12*a* joined together.

As is shown in greater detail in accompanying FIGS. 2-6, each of the structural panels 12a includes an external fuselage skin 14 joined to a lower flange 16a (see FIG. 6) of longitudinal stringers (a representative few of which are identified by reference numeral 16). The skin 14 and the stringers 16 are formed of a reinforced resin composition material and thus are capable of being co-formed to one another during the resin curing cycle as briefly described above so as to be bonded to one another. Circumferentially arcuate frame members (a representative few of which are identified by reference numeral 18) are formed of a metal (e.g., aluminum alloy) and joined to an upper flange 16b (see FIG. 6) of the stringers by suitable means (e.g., riveting and/or bonding). Thus, the frame members 18 are spaced radially inwardly relative to the skin 14 by a dimension corresponding to the stringers 16 so as to define an annular space between the skin 14 and frame members 18 through which the stringers pass. The adjacent structural panels 12a are joined to one another (e.g., by riveting and/or bonding) by longitudinal splice members 20.

Accompanying FIGS. 7-12 show the manner in which the various structural components are joined to one another. In this regard, as noted previously, since the frame and splice members 18, 20, respectively, are constructed of a metallic material, a shear tie 22 may be provided which spans the space between the bottom of the frame member 18 and the splice member 20. The shear tie 22 is formed of a metallic material and structurally united to the frame and splice members 18, 20, respectively, by suitable means (e.g., riveting and/or bonding) so as to establish an electrical path therebetween. Since an electrical path is established by virtue of the frame members 18, splice members 20 and the shear ties 22, a wire mesh which conventionally must be provided for an all composite fuselage is not necessarily required (but could optionally be provided if deemed desirable).

As shown in FIGS. 11 and 12, a secondary shear tie 24 may be provided in other locations between adjacent pairs of stringers 16 so as to span the space between the frame member 18 and the interior of the skin 14. However, unlike the primary shear tie 22 discussed above, the secondary shear tie 24 may be formed of a reinforced resin composition material. Alternatively, all or a desired number of the secondary shear ties 24 may be formed of a metallic material and electrically connected to a wire mesh (not shown) if provided as a component part of the skin 14. In such a manner therefore, the secondary shear ties 24 may contribute to establishing an electrical path if desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aircraft fuselage structural component comprising:
   non-metallic skins;
   longitudinally spaced-apart metallic frame members spaced from the skins and defining a latitudinal section of an aircraft fuselage section;
   longitudinally oriented non-metallic stringers having a lower flange joined to the skins and an upper flange joined to an upper part of the frame members;
   at least one metallic splice member connecting adjacent ones of the skins; and
   metallic shear ties each being connected to respective frame and splice members.

2. The component of claim 1, further comprising secondary shear ties which span the space between the frame members and the skins, the secondary shear ties being structurally united to the frame members and the skins.

3. The component of claim 2, wherein the secondary shear ties are formed of a metallic or non-metallic material.

4. The component of claim 1, wherein the stringers and the skins are each formed of a co-cured resin reinforced composite material.

5. An aircraft fuselage comprising aircraft fuselage structural components as in claim 1, wherein a plurality of the longitudinal spice members are provided so as to connect the skins of adjacent ones of the fuselage structural components and thereby join the structural components to one another.

6. The aircraft fuselage of claim 5, further comprising secondary shear ties which span the space between the frame members and the skin, the secondary shear ties being structurally united to the frame members and the skin.

7. The aircraft fuselage of claim 6, wherein the secondary shear ties are formed of a metallic or non-metallic material.

8. The aircraft fuselage of claim 5, wherein the stringers and the skins are each formed of a co-cured resin reinforced composite material.

9. The aircraft fuselage of claim 5, wherein the metallic shear ties span the space between the frame members and the skin and are structurally united to the respective frame and splice members so as to establish an electrical path therebetween.

10. An aircraft which comprises an aircraft fuselage of claim 5.

11. A method of making an aircraft fuselage structural component comprising:
   (a) joining non-metallic skins to a lower flange of longitudinal non-metallic stringers; and thereafter
   (b) joining latitudinal metallic frame members to an upper flange of the stringers so as to be in a spaced relationship with the skin.

12. The method of claim 11, wherein step (a) includes providing the skin and stringers of a reinforced resin composite material, and co-curing the skin and stringers so as to bond one to another.

13. The method of claim 11, wherein step (b) includes interconnecting the frame members and the skin with the metallic shear ties so as to span the space therebetween.

14. A method of assembling an aircraft fuselage section comprising:
   (i) providing plural aircraft fuselage structural components as in claim 1; and
   (ii) joining the skins of adjacent ones of the fuselage structural components to one another with the longitudinal splice members.

15. The method of claim 14, wherein the skins and stringers are formed of a reinforced resin composite material, and wherein the method further comprises establishing an electrical path between the frame members and the splice members by interconnecting the frame and splice members with a respective metallic shear ties so as to span the space therebetween.

16. The method of claim 14, wherein step (b) includes interconnecting the frame members and the skins with secondary shear ties so as to span the space therebetween.

* * * * *